J. S. TAYLOR.

MACHINE FOR FELTING HAT BODIES.

No. 10,144. Reissued June 27, 1882.

WITNESSES

Franck L. Durand.

W. T. Cole.

INVENTOR

James S. Taylor by Geo. H. Mann

Attorney

N. PETERS, Photo-Lithographer, Washington, D. C.

UNITED STATES PATENT OFFICE.

JAMES S. TAYLOR, OF DANBURY, CONNECTICUT.

MACHINE FOR FELTING HAT-BODIES.

SPECIFICATION forming part of Reissued Letters Patent No. 10,144, dated June 27, 1882.

Original No. 194,566, dated August 28, 1877. Application for reissue filed May 8, 1882.

*To all whom it may concern:*

Be it known that I, JAMES S. TAYLOR, of Danbury, county of Fairfield, and State of Connecticut, have invented certain new and useful Improvements in Machinery for Felting Hats, which improvements are fully set forth in the following specification and accompanying drawings, in which—

Figure 1:
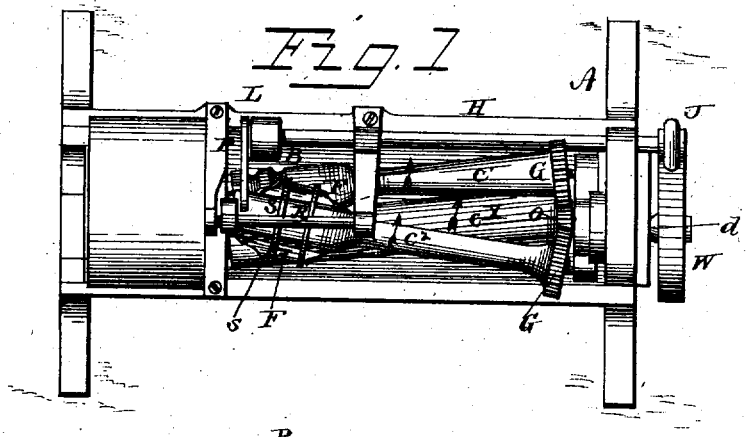
Figure 2:
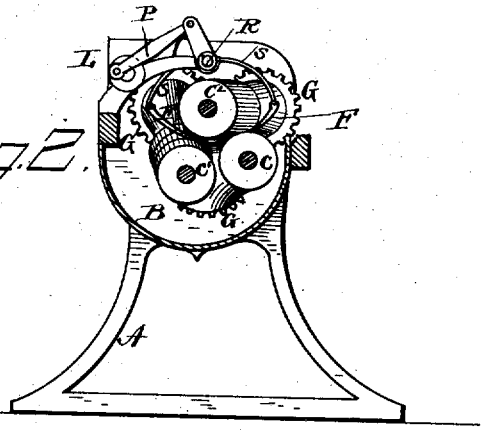
Figure 3:
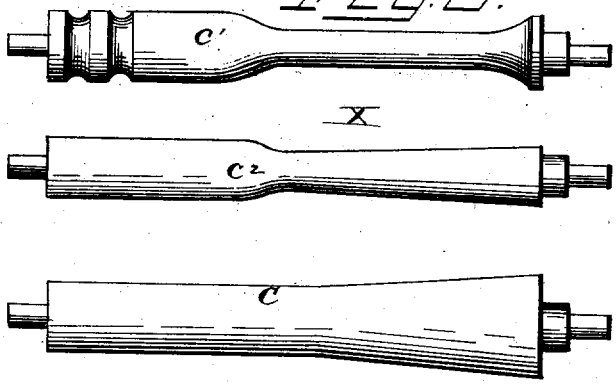

Figure 1 is a plan view of my machine. Fig. 2 is a cross-section of the same, and Fig. 3 is a view of the feed-rolls.

The object of my invention is to facilitate the process of felting hats and other fabrics.

In the drawings, A represents the frame of the machine; B, a vat or kettle for containing hot water. $c$ $c'$ $c^2$ are three rollers, with suitable bearings, and provided each with cog-wheels G G G, which are driven by a small cog-wheel, O, fastened to the shaft $d$, so connected as to revolve the rollers in the same direction and driven by the wheel W. The rollers $c$ $c'$ $c^2$ are so arranged with respect to each other that viewed in either direction their axes are diagonally crossing each other near the center.

F F are two felters or workers passing between the rollers and connected with the rocker-shaft R by means of the spring-arms $s$ $s$.

Motion is communicated to the workers through the rocker-shaft by means of the pitman P, which connects the rocker-shaft to the crank L, attached to the rotating shaft H, which shaft is rotated by means of the friction-pulley J as it is pressed against the face of the wheel or pulley W.

The rollers $c$ $c'$ $c^2$ are suspended by means of their support partially below the upper surface of the vat B, so as to cause the material to be felted to be saturated or immersed in the liquid, which is necessary while undergoing the process of felting.

A chamber or receptacle, X, is formed by placing the axis of the roller $c$ in a plane lower than that in which the receiving ends of the rollers $c'$ $c^2$ are situated, there being nothing to occupy the space thus formed, into and from which the goods can be readily inserted.

The vat is filled with water, which is raised nearly or quite to a boiling-heat by means of steam or other process of heating.

The operation of my invention is as follows: The hat-bodies or other fabrics are, in the first place, formed in the usual manner. A workman then rolls up one or more hat-bodies in a cloth about eighteen inches square, and places the roll in the machine at the chamber or receptacle X, formed for that purpose, at the right-hand end or gear end of the machine. The revolving motion of the rollers being in the direction marked by the arrows imparts to the roll of hats a rovolving or rotary motion, and the diagonal position of the rollers gives the hats a longitudinal motion in the direction of the axes of the rollers. By this means the hats are carried through between the rollers, under the felters or workers, and discharged on the receiver placed at the discharge end of the rollers. The action of the felters or workers imparted by their rapid positive motion against the material to be felted, in connection with the hot water applied to the hats, causes the material to be firmly and rapidly felted together. The process is completed by passing the goods to be felted frequently through the machine.

By this improvement I am enabled to save a large amount of labor and to produce a better and more uniform quality of goods.

I am aware of Patent No. 112,197, granted February 28, 1871, to Joseph Vero, and disclaim the invention therein described, an essential feature of Vero's machine being the upper screwed or wormed roller, which exerts a pressure upon the roll of goods during manipulation, and which must be raised when the goods are to be inserted.

I also disclaim the invention set forth in Patent No. 28,185, granted May 8, 1860, to M. R. Lemman, in which four rollers are placed eccentrically on their axes, so that the rollers shall act or press alternately in pairs on the goods between them. Such arrangement of rollers does not admit of the formation of the receiving-chamber made by my disposition of rollers.

Having described my invention, what I claim as new, and desire to secure by Letters Patent, is—

1. The combination of rollers arranged to form a chamber unobstructed above for the convenient reception of goods to be felted, substantially as set forth, and whereby the same may be readily inserted without effecting change in the position of any part of the machine.

2. The combination, with a vat for holding hot water, of rollers suspended partially below the upper surface of the vat and arranged to form a receiving-chamber unobstructed above for the convenient reception of goods to be felted, substantially as set forth, and whereby the same may be readily inserted without effecting change in the position of any part of the machine.

3. The combination of the three rollers, $c\,c'\,c^2$, constructed as shown and described, and arranged with their axes diagonally crossing each other, for the purpose specified.

4. The combination of the felters F F with the rollers $c\,c'\,c^2$, arranged with their axes diagonally crossing each other, in the manner and for the purpose as described.

5. The rocking felter or felters F, in combination with the rollers $c\,c'\,c^2$, for the purpose of imparting to the material to be felted a positive, rotatory, and felting motion in the process of felting, substantially as shown and described.

6. The combination of the springs $s\,s$, felters F F, and rollers $c\,c'\,c^2$, in the manner and for the purpose as described.

JAMES S. TAYLOR.

Witnesses:
OLIVER P. CLARK,
NORMAN HODGE.